Nov. 21, 1961  R. B. COLLINS  3,009,741
TILTING FARM WAGON
Filed Sept. 17, 1957  3 Sheets-Sheet 1
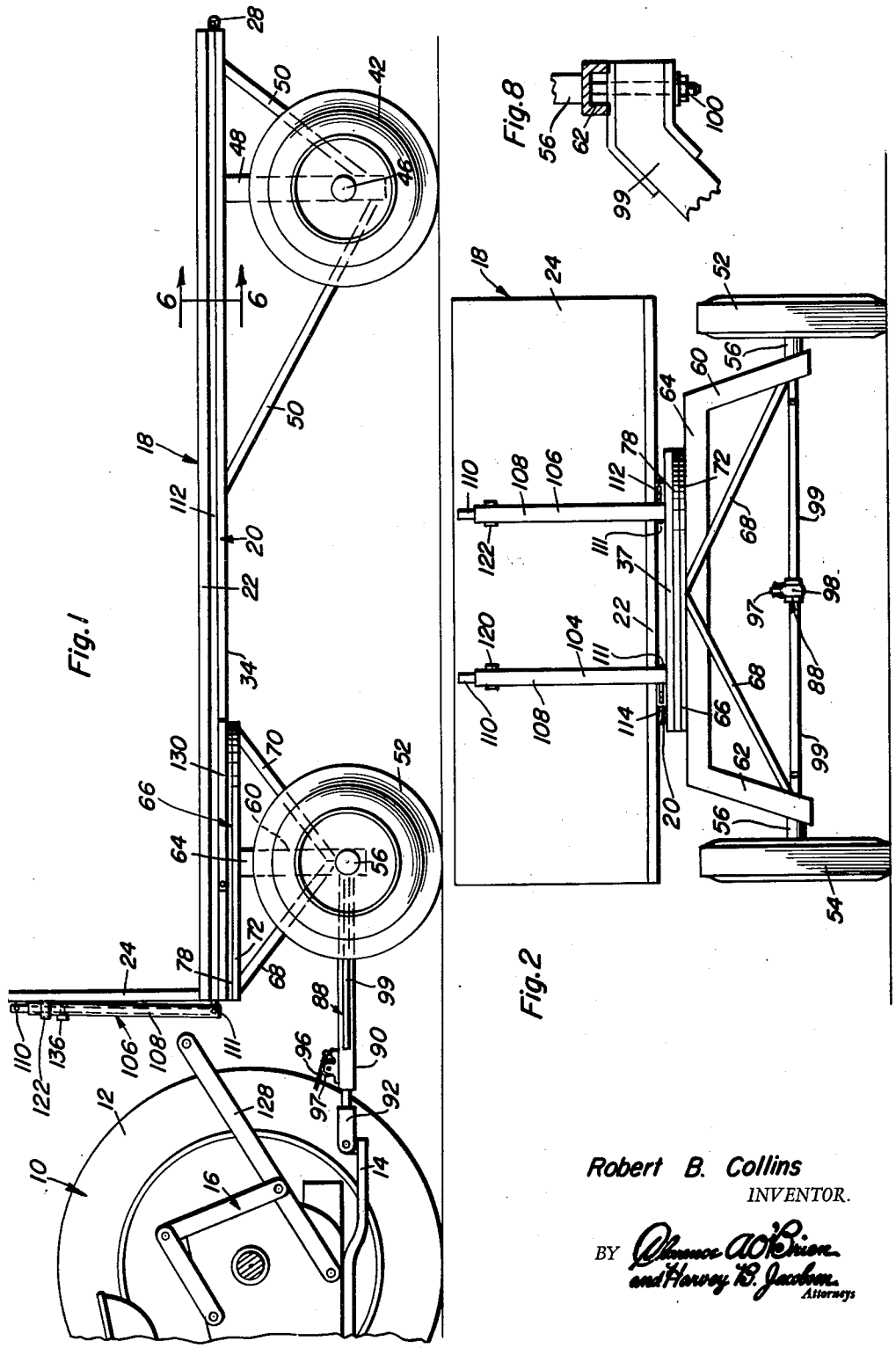
Robert B. Collins
INVENTOR.

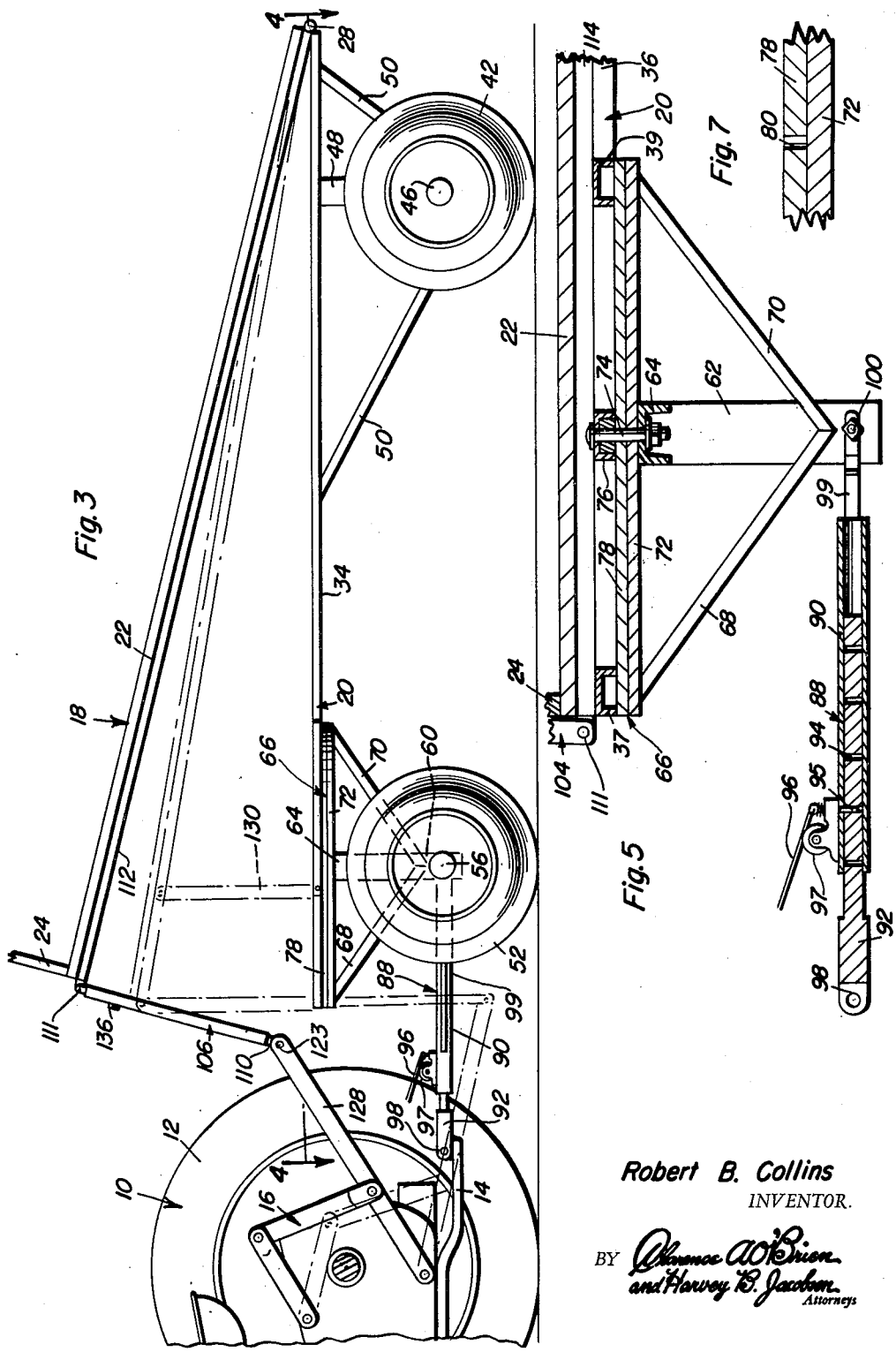

Nov. 21, 1961  R. B. COLLINS  3,009,741
TILTING FARM WAGON

Filed Sept. 17, 1957  3 Sheets-Sheet 3

Robert B. Collins
INVENTOR.

United States Patent Office 3,009,741
Patented Nov. 21, 1961

3,009,741
TILTING FARM WAGON
Robert B. Collins, R.F.D. No. 2, Smyrna, Tenn.
Filed Sept. 17, 1957, Ser. No. 684,451
4 Claims. (Cl. 298—19)

This invention relates to a farm wagon and more particularly to a farm wagon which is capable of elevating to unload.

An object of the invention is to provide a practical farm wagon which is capable of being adjusted to the loading and unloading positions by utilization of the available power of a tractor lift. After the wagon body is elevated to the unloading position, there are means which may be used for the purpose of elevating the wagon body still further inasmuch as the travel of the ordinary tractor lift is limited. My invention achieves this without the adoption of complicated and expensive hoists, lift mechanisms or attachments which must connect to a tractor power take-off. This avoids a considerable initial expense and due to the simplicity of the invention, makes maintenance an insignificant problem if any maintenance exists at all.

A further object of the invention is to provide an all purpose farm wagon capable of exceptional maneuverability in that the front wheels may turn in a complete circle for purposes of steering. In addition to this, the tongue for the wagon may be coupled to any tractor drawbar and due to the telescoping adjustment of the tongue, little or no difficulty is encountered in the use of any manufacturer's make of tractor.

A three point hitch of any type can be used to raise the wagon body and enable the additional steps for elevation to be taken.

Other objects and features of importance will become apparent in following the description of the illustrated form of the invention in the accompanying drawings wherein:

FIGURE 1 is a side elevational view of a farm wagon constructed in accordance with the invention, the wagon being shown attached to a conventional tractor that has a drawbar and three point lift;

FIGURE 2 is a front view of the tractor drawn wagon of FIGURE 1;

FIGURE 3 is a side view of the tractor and wagon showing the wagon bed in an elevated position in full lines and in dotted lines, showing the wagon body in another position;

FIGURE 5 is a sectional view taken on the line 5—5 of FIGURE 4 and showing the fifth wheel and tongue construction;

FIGURE 7 is an enlarged sectional view showing an oiler well and taken on the line 7—7 of FIGURE 4;

FIGURE 8 is a fragmentary sectional view showing the means to attach the bracing at the front axle.

Figure 4:
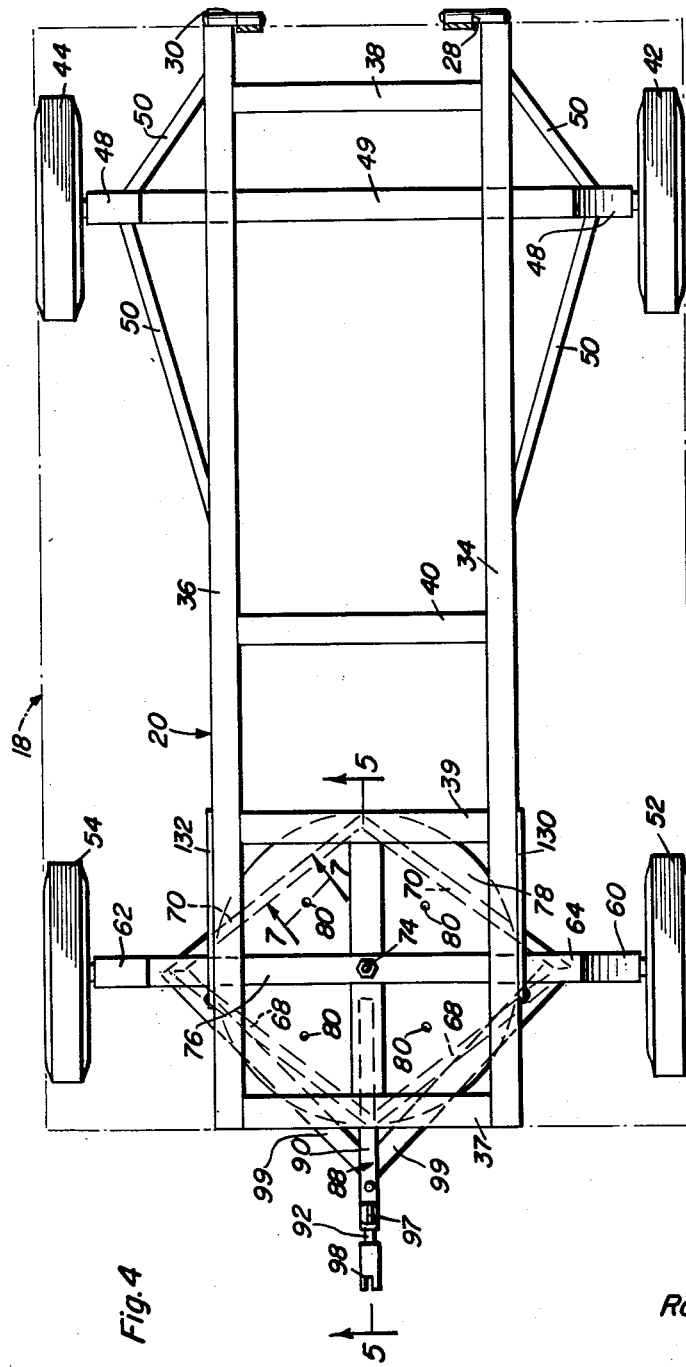
FIGURE 4 is a sectional view taken on the line 4—4 of FIGURE 3.

In the accompanying drawings there is shown a tractor 10 which is of any manufacturer's make and which has rear wheels 12. Among the other essentials of the tractor there are drawbar 14 and the three point tractor lift 16. Each of these is conventional and forms no part of the actual invention, other than that my wagon 18 may be drawn and maneuvered as well as adjusted by these parts of tractor 10. The wagon constructed in accordance with the invention has a frame 20 carrying a bed 22 having a front wall 24. The bed 22 may be equipped with sides (not shown) if so desired. The rear end of the frame 20 is fitted with a pair of hinges 28 and 30 connected to the bed 22 of the wagon. As shown in FIGURE 4 the frame 20 comprises side rails 34 and 36 together with front and rear cross members 37 and 38 and intermediate cross members 39, 40 and 76.

The rear wheels 42 and 44 are mounted for rotation on stub axles 46 carried by downturned portions 48 of an axle member 49 which is secured to the frame 20, the portions 48 being braced as at 50 to the rails 34 and 36 of the frame. The front wheels 52 and 54 are mounted in such a way that they contribute very much to the maneuverability of the farm wagon. The wheels are mounted on stub axles 56 which are secured to the sides 60 and 62 of yoke 64. A fifth wheel 66 is mounted above the yoke 64 and has front and rear braces 68 and 70 attached to its bottom plate 72 and to the sides 60 and 62 respectively of the yoke 64. This stabilizes the front wheel assembly. The center bolt 74 of the fifth wheel passes through the cross member 76 and through both the top plate 78 of the fifth wheel and the bottom plate 72 thereof and through the yoke 64. A number of holes 80 are in the top plate 78 of the fifth wheel to serve as oilers by holding a quantity of oil trapped in each. The height of the wheels 52, 54 is such that the fifth wheel is capable of rotating in a full circle about the center bolt 74 for steering purposes.

Extensible tongue 88 is made of a pair of telescoping members 90 and 92, the member 90 being hollow with the member 92 slidable therein. A number of apertures 94 are in member 92 in order to accommodate a spring-pressed pin 95 that is connected to a cord 96 passing over a pulley 97 on the member 90 toward the tractor 10, so that it may be actuated by the operator of the tractor. By this construction the tongue can be extended or retracted to the selected position of adjustment. An ordinary coupling 98 is at the front end of member 92 so as to attach to the tractor drawbar 14. A pair of rearwardly divergent draft bars 99 are rigidly secured at their forward ends to the tongue member 90 and are pivoted at their rear ends 100 to the sides 60, 62 of the yoke 64, whereby the entire tongue is swingable in a vertical plane.

Figure 6:
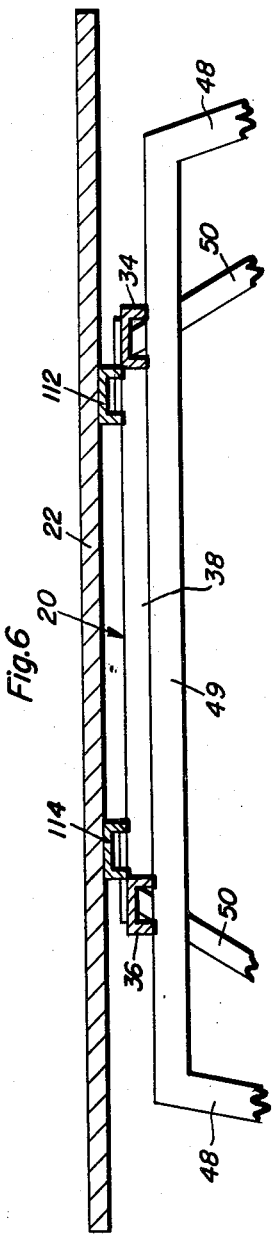
FIGURE 6 is a sectional view taken on the line 6—6 of FIGURE 1.

There are two push rod assemblies 104 and 106 respectively (FIGURE 2) that are used as a part of the means for elevating the wagon body to a position shown in FIGURE 3. Each push rod assembly consists of an outer sleeve 108 and an inner rod 110 which may be locked against sliding in the sleeve by a removable locking pin 136. The outer sleeves of the push rod assemblies are connected by pivots 111 to the longitudinal stringers 112 and 114 (FIGURE 6) that are attached to the underside of the bed 22. The extremities of the rods 110 of the push rod assemblies have apertures in which to accommodate pins when it is desired to elevate the wagon body. Ordinarily the push rod assemblies are swung upwardly to an inoperative position against the front surface of the front wall 24 of the wagon bed, where they are held by a pair of spring clips 120 and 122. When it is necessary to elevate the wagon bed, the push rod assemblies are swung downwardly from their spring clips 120 and 122 and pins 123 are used to couple the apertured ends of the push rods 110 to the two lift arms 128 of the three point lift 16. The lift is then operated in the usual way thereby raising the front of the bed 22 about the axis of hinges 28 and 30. Inasmuch as the motion of an ordinary three-point hitch of a tractor is quite limited for a duty such as being described, after the bed is raised as much as possible, braces 130 and 132 which are pivoted to the sides rails 34 and 36 of the wagon frame, are raised to an approximately vertical position and are placed underneath the wagon bed to hold it elevated. The pins 123 coupling the push rod assemblies 104 and 106 to the lift arms 128, are removed and the pins 136 that constitute a part of the push rod assemblies, are removed and the two parts of each assembly are extended to the desired length. Pins 136 are replaced in a new aperture arranged such as the apertures in the tongue 88, and then the push rod assemblies may be connected to the lift arms 128 after these lift arms have been returned to the lowermost position. By again operating the tractor lift 16 bed 22 is capable of being elevated even farther. Various farming operations will be materially expedited by the extra reach of the wagon body travel that is obtained in this way.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The combination of a tractor having a power lift, and a wagon having front and rear ends comprising a wheeled frame connected at its front end to and drawn by said tractor, a wagon bed carried by and pivotally connected at its rear end to said frame for tilting movement about an axis transverse of the frame whereby the front end of said bed may be raised from a substantially horizontal lowered position on the frame, an extensible link having a fixed contracted length and including a pair of slidably telescoped sections and means for locking said sections in an extended position, one of said link sections being pivoted to the front end of said bed and the other link section being connected to said power lift whereby said bed may be raised to a predetermined point by said power lift when the link is contracted, and means provided on said frame for temporarily supporting said bed at said predetermined point while the power lift is lowered and the link extended whereby said bed may be raised beyond said predetermined point during subsequent raising of the power lift.

2. The combination as defined in claim 1 wherein said last mentioned means comprise a brace pivoted at one end thereof to the front end portion of said frame and having its other end supportably engageable with said bed.

3. The combination of a tractor having a draw bar and a power lift at the rear end thereof, and a wagon having front and rear ends comprising a wheeled frame connected at its front end to said draw bar, a wagon bed carried by and pivotally conected at its rear end to said frame for tilting movement about an axis transverse of the frame whereby the front end of said bed may be raised from a substantially horizontal lowered position on the frame, an upstanding front wall provided on said bed, a pair of transversely spaced extensible links having a fixed contracted length and each including a pair of slidably telescoped sections and means for locking said sections in an extended position, one section of each link being pivoted to the front end of said bed with the links extending downwardly from the latter, means separably connecting the other section of each link to said power lift whereby said bed may be raised to a predetermined point by the power lift when the links are contracted, means provided on said frame for temporarily supporting said bed at said predetermined point while the power lift is lowered and the links extended whereby the bed may be raised beyond said predetermined point during subsequent raising of the power lift, said links being swingable upwardly to inoperative positions against said front wall upon separation thereof from the power lift, and means on said front wall for retaining said links in their inoperative positions.

4. In a wagon, the combination of a wheeled frame adapted to be drawn by a tractor equipped with a power lift, said frame having front and rear ends, a wagon bed carried by said frame and pivotally connected to the rear end of the frame for tilting about an axis transverse of the frame whereby the front end of the bed may be raised from a substantially horizontal lowered position on the frame, a link pivoted at one end thereof to the front end of said bed and adapted at its other end for pivotal connection to a tractor power lift whereby the bed may be raised and lowered, and means on said frame for supporting said bed in a raised position independently of said link, said link being extensible and including a pair of slidably telescoped sections having a fixed contracted length and means for locking said sections in an extended position.

References Cited in the file of this patent

UNITED STATES PATENTS

| | | |
|---|---|---|
| 74,131 | Priest | Feb. 4, 1868 |
| 172,454 | Kramer | Jan. 18, 1876 |
| 227,274 | Letourneau | May 4, 1880 |
| 296,938 | Dees | Apr. 15, 1884 |
| 325,185 | Nolen | Aug. 25, 1885 |
| 492,562 | Senderling | Feb. 28, 1893 |
| 1,563,685 | Boys | Dec. 1, 1925 |
| 1,588,396 | Winn | June 8, 1926 |
| 1,780,973 | Graham et al. | Nov. 11, 1930 |
| 2,166,722 | Kirksey | July 18, 1939 |
| 2,469,199 | Lewis | May 3, 1949 |
| 2,493,150 | Kroger | Jan. 3, 1950 |
| 2,591,435 | Hunsaker et al. | Apr. 1, 1952 |
| 2,617,683 | Strom | Nov. 11, 1952 |
| 2,632,628 | Bunting | Mar. 24, 1953 |
| 2,719,730 | Beck | Oct. 4, 1955 |
| 2,765,193 | McGrew | Oct. 2, 1956 |